(12) United States Patent
Kaneko

(10) Patent No.: US 6,227,893 B1
(45) Date of Patent: May 8, 2001

(54) CARD CONNECTOR

(75) Inventor: Tetsuya Kaneko, Chiba-ken (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/289,632

(22) Filed: Apr. 12, 1999

(30) Foreign Application Priority Data

May 18, 1998 (JP) .................................................. 10-135772

(51) Int. Cl.[7] .................................................. H01R 13/62
(52) U.S. Cl. .......................................... 439/326; 439/910
(58) Field of Search .............................. 439/59–62, 83, 439/259, 260, 261, 326, 327, 372, 377, 910

(56) References Cited

U.S. PATENT DOCUMENTS

| | | | |
|---|---|---|---|
| 5,211,566 | * | 5/1993 | Bates et al. ............................. 439/66 |
| 5,224,873 | | 7/1993 | Duffet et al. . |
| 5,337,220 | | 8/1994 | Granitz . |
| 5,933,328 | * | 8/1999 | Wallace et al. ....................... 361/737 |
| 5,996,891 | * | 12/1999 | Braun ................................... 235/441 |

FOREIGN PATENT DOCUMENTS

| | | |
|---|---|---|
| 0 585 825 | 3/1994 | (EP) . |
| 0 840 246 | 5/1998 | (EP) . |
| 62-24491 | 2/1987 | (JP) . |
| 62-219193 | 9/1987 | (JP) . |
| 4-291692 | 10/1992 | (JP) . |
| 8-241754 | * 9/1996 | (JP) . |
| 9-185973 | 7/1997 | (JP) . |
| 10-171948 | 6/1998 | (JP) . |

* cited by examiner

Primary Examiner—Khiem Nguyen
(74) Attorney, Agent, or Firm—Wenderoth, Lind & Ponack, L.L.P.

(57) ABSTRACT

A card connector includes a connector housing formed by supporting a basal end of a cover on a basal end of a base through a pin such that the cover can open and close with respect to the base. A card insertion port is formed in a free end of the cover, and an IC card can be inserted into the cover through the card insertion port. Then, the cover holding the IC card can be closed with respect to the base, so that external terminals of the IC cards are brought into contact, under pressure, with contacts formed on the base. The card connector also includes a lock bar extending in parallel to the card receiving port and resiliently held, in a locking direction, on the other end portion of the base such that the lock bar can be rotated in a locking direction and in an unlocking direction, the lock bar being brought into locking and unlocking relation with the free end of the cover to realize a locking and an unlocking state.

8 Claims, 5 Drawing Sheets

CARD CONNECTOR

BACKGROUND OF THE INVENTION

This invention relates to a connector for an integrated circuit (IC) card which is, in use, attached to a given electronic device such as a telephone set, a cash dispenser, a personal computer, a camera, or the like.

There is known a card connector, as discussed in Japanese Patent Unexamined Publication (Kokai) No. Hei 9-185973, which comprises a connector housing constituted by a base and a cover openable and closable with respect to the base, the base being provided with a plurality of contacts arranged thereon in such a manner as to be able to contact external terminals of an IC card received in the connector housing, and a lock mechanism for maintaining a closed position of the cover with respect to the base.

As the above lock mechanism, a lock pawl is raised from a side plate of the cover and this lock pawl, when the cover is closed with respect to the base, is snap fitted into a lock hole for a resilient lock piece provided on the base.

However, the above conventional card connector has the following shortcomings.

In order to cancel the snap fitting relation between the lock pawl and the lock hole, it is required to pull up the cover in the opening direction with the cover pinchingly held between the thumb and the index finger. This degrades a favorable operability when the cover is opened to insert or remove the IC card.

In addition, when the lock pawl or the lock piece is snap fitted to or detached from the lock hole, the lock pawl is liable to be permanently deformed or cut off, thus resulting in an incomplete locking condition.

The present invention has been accomplished in view of the above shortcomings inherent in the conventional devices.

OBJECT OF THE INVENTION

It is, therefore, an object of the present invention to provide a card connector which is small in design.

Another object of the present invention is to provide a card connector capable of providing a reliable connection between contacts thereof and terminals of an IC card.

A further object of the present invention is to provide a card connector in which a soldering state of a surface mounting terminal can be visually recognized.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly, other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

To achieve the above objects, according to one version of the present invention, there is essentially provided a card connector comprising a connector housing formed by supporting a basal end of a cover on a basal end of a base through a pin such that the cover can open and close with respect to the base. A card insertion port is formed in a free end of the cover, and an IC card can be inserted into the cover through the card insertion port and then, the cover holding the IC card can be closed with respect to the base, so that external terminals of the IC card are brought into contact, under pressure, with contacts formed on the base. The card connector further comprises a lock bar extending in parallel to the card receiving port and resiliently held, in a locking direction, on the other end portion of the base such that the lock bar can be rotated in a locking direction and in an unlocking direction, the lock bar being brought into locking and unlocking relation with the free end of the cover to realize a locking and an unlocking state.

According to another aspect of the present invention, there is essentially provided a card connector comprising a connector housing formed by supporting a basal end of a cover on a basal end of a base through a pin such that the cover can open and close with respect to the base, a pair of left and right guide rails extending from the basal end of the cover to a free end thereof along opposite left and right sides of a top plate of the cover. A card receiving port is formed by an opening, which opens at the free end of the cover, of a card receiving space defined within the cover by the left and right guide rails and the top plate. A plurality of contacts are arranged on the base in such a manner as to be able to contact external terminals formed on an IC card inserted into the card receiving space. The cover with the IC card inserted in the card receiving space can be closed with respect to the base thereby bringing the external terminals of the IC card inserted in the IC receiving space of the cover into contact, under pressure, with the contacts of the base. The card connector further comprises a lock bar extending in parallel to the card receiving port and resiliently held, in a locking direction, on the other end portion of the base such that the lock bar can be rotated in a locking direction and in an unlocking direction. One pair of locking portions are provided on longitudinally opposite ends of the lock bar, and one pair of opponent portions (lock engaging portions) provided on free ends of the one pair of guide rails, the one pair of lock portions being hooked to the one pair of opponent portions by the resilient force to retain a closed position of the cover with respect to the base, the lock bar, when the cover is closed with respect to the base, being allowed to extend forwardly of and in opposing relation to the card receiving port.

It is preferred that the free ends of the pair of guide rails are projected in an extending direction thereof to define the pair of opponent portions, upper surfaces of the opponent portions are stepped such that the stepped areas of the upper surfaces of the pair of opponent portions are lower than an upper surface of the top plate and the pair of lock portions of the lock bar are hooked to the stepped areas of the upper surfaces of the pair of opponent portions.

It is also preferred that the pair of lock portions of the lock bar are each provided with a first guide surface which, when the cover is closed with respect to the base, is pushed by a corresponding of the one pair of opponent portions of the cover to rotate the lock bar slightly in an unlocking direction against the resilient force, and the lock bar is provided on an inner surface thereof with a second guide surface which is slanted by rotation of the lock bar, thereby guiding an end edge of the IC card.

It is also preferred that the each of the contacts has a surface mount terminal projecting downwardly of the lock bar and the lock bar is provided with an opening through which the surface mount terminal can be viewed from above.

DETAILED DESCRIPTION OF THE EMBODIMENT

One embodiment of the present invention will now be described in detail with reference to FIGS. 1 to 7 of the accompanying drawings.

As shown in FIGS. 1 to 6, a card connector of the present invention includes a base 1 made of insulative material and a cover 2 made of insulative material or metal material. The cover 2 is attached at its basal end to a basal end of the base 1 through a pin 3 such that the cover 2 can rotate about the pin 3. Rotation of the cover 2 makes it possible to close the cover 2 with respect to the base 1.

Figure 1:
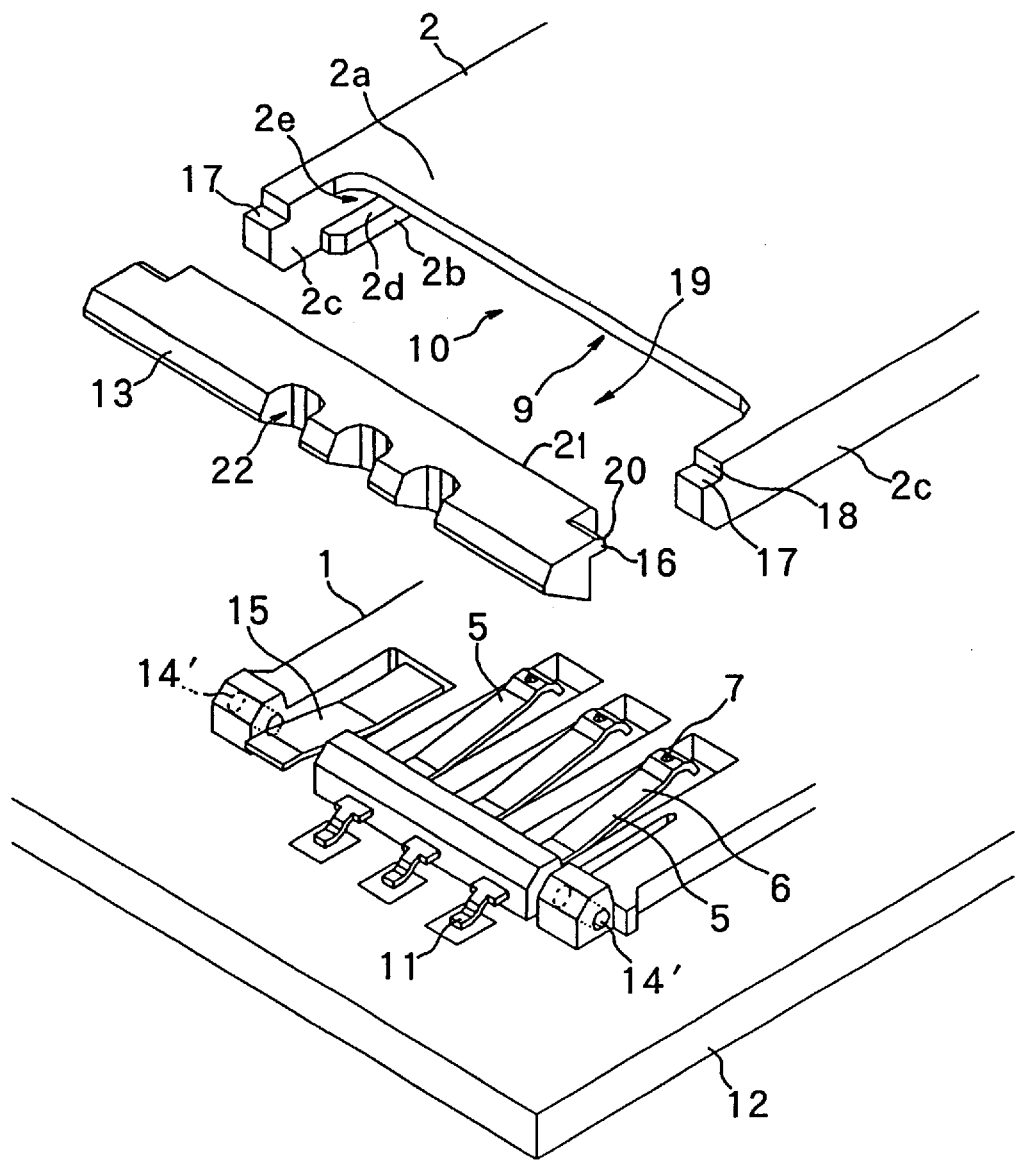
FIG. 1 is a perspective view of an essential portion of a lock mechanism which is formed on one end of a base and one end of a cover.
Figure 2:
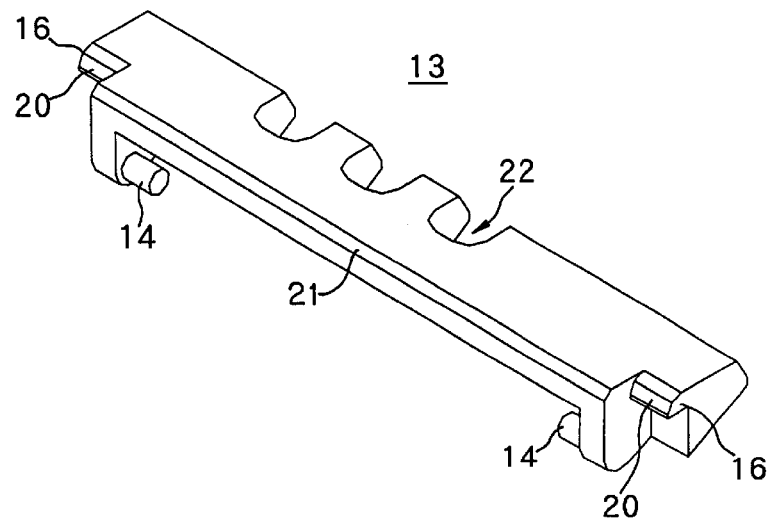
FIG. 2 is a perspective view of a lock bar when viewed in a direction opposite to that of FIG. 1.
Figure 3:
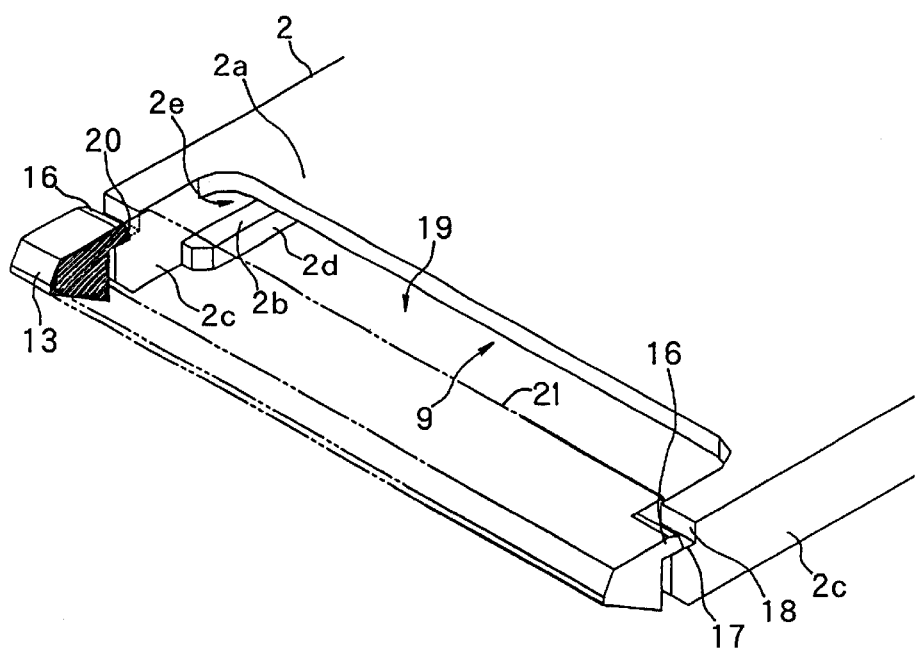
FIG. 3 is a perspective view of an essential portion showing a fitted state of the lock bar.
Figure 4A:
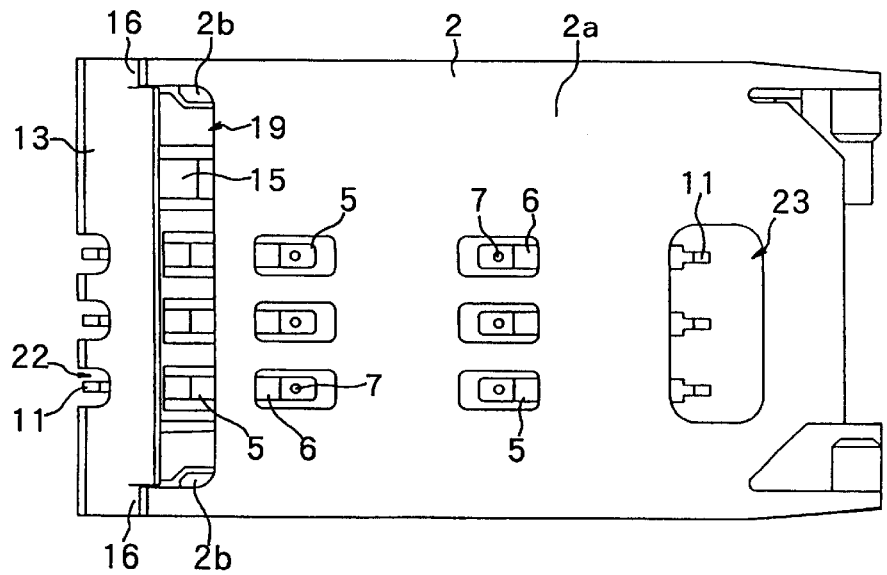
FIG. 4A is a plan view of a card connector when the base and the cover are held in closed position by the lock bar.
Figure 4B:
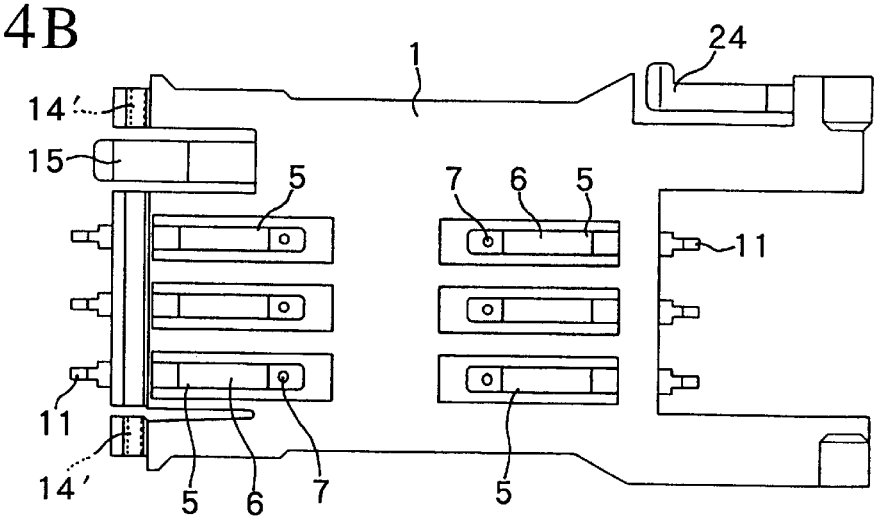
FIG. 4B is a plan view of the base in the card connector.
Figure 5:
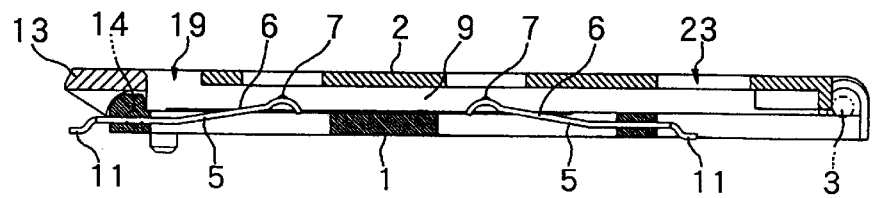
FIG. 5 is a vertical sectional view of the card connector of FIG. 4A.
Figure 6A:
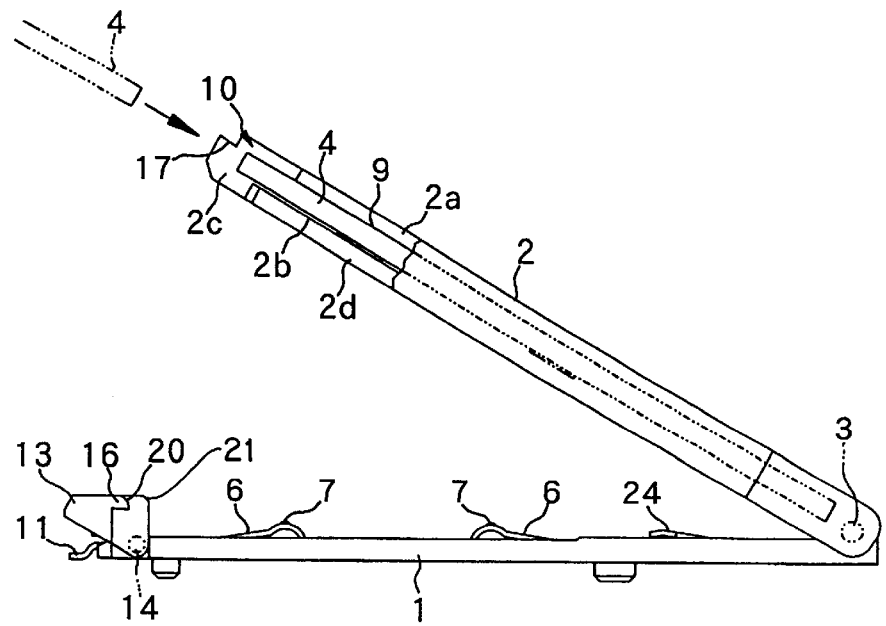
FIGS. 6A to 6D are side views for sequentially explaining the operating states of the lock bar when the cover is closed with respect to the base.
Figure 6B:
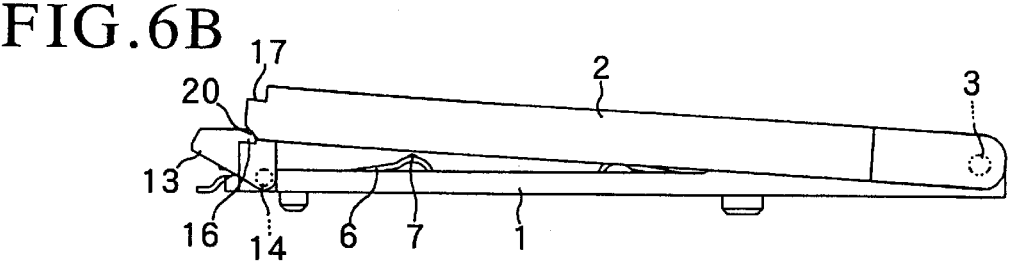
Figure 6C:
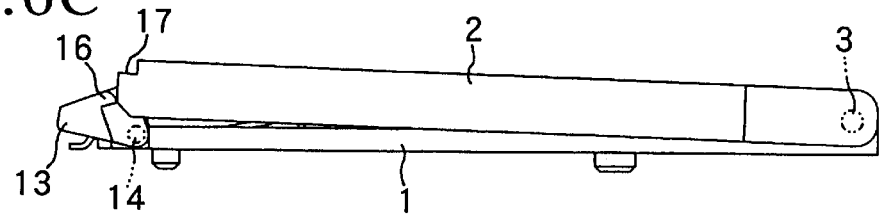
Figure 6D:
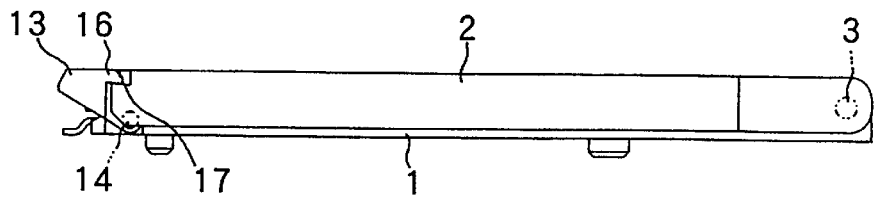
Figure 7A:
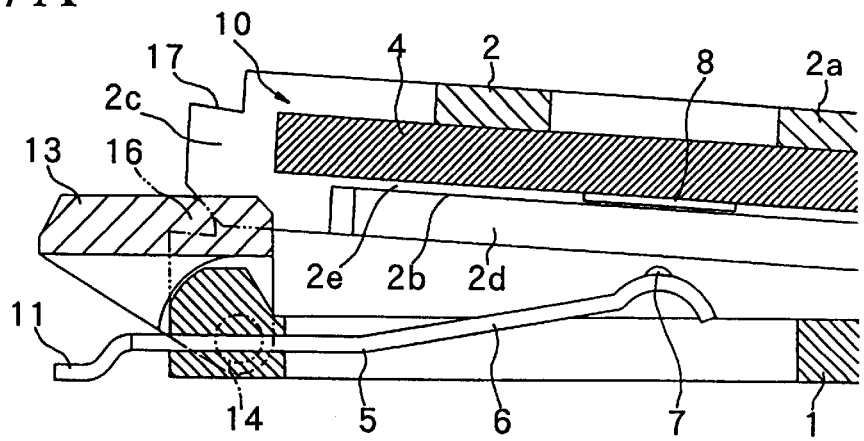
FIGS. 7A to 7C are enlarged sectional views of an essential portion of a lock portion of FIGS. 6B to 6D.
Figure 7B:
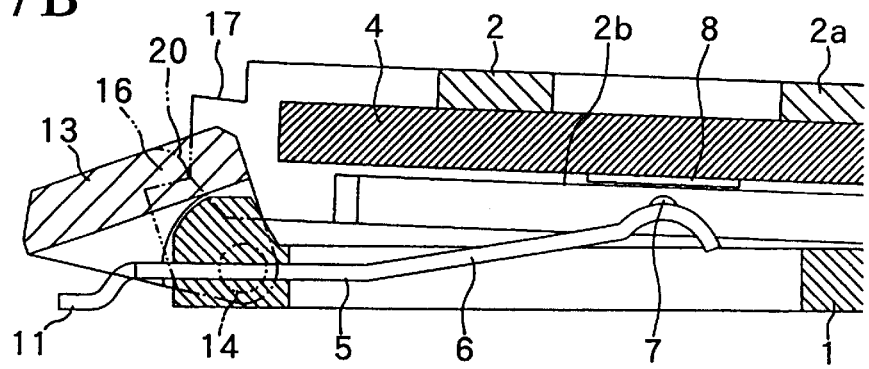
Figure 7C:
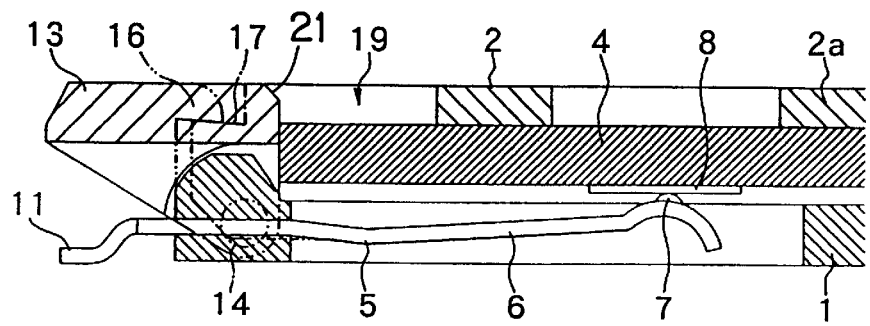

The base 1 and the cover 2 constitute a flat and square connector housing for receiving an IC card 4. The base 1 forming the connector housing has a plurality of contacts 5. The contacts 5 are each formed of an electrically conductive elongate piece which is punched out of a metal plate and bent. The contacts 5 are arranged in array in such a manner as to correspond to external terminals 8 of the IC card 4. In this embodiment, a group of the contacts 5 are arranged in two rows as shown in FIG. 4.

A contact portion 7 projecting from an inner surface (upper surface) of the base 1 is formed on a free end of the electrically conductive elongate piece which constitutes each contact 5.

The electrically conductive elongate piece constituting each contact 5 has a resilient contact piece 6 extending in a direction of insertion of the IC card 4 from an implanting portion thereof. The contact portion 7 is formed on a free end of the resilient contact piece 6. The electrically conductive elongate piece also has a surface mount terminal 11 projecting in the other side of the resilient contact piece 6. Through this surface mount terminal 11, the contact 5 is connected to a circuit board 12 in a given electronic device by soldering or the like.

The IC card 4 exhibits a flat and generally square configuration. The IC card 4 has an IC chip for recording or reading data stored in the IC card 4. External contacts 8 of the IC chip are arranged in array on a front surface of the IC card 4 in such a manner as to correspond to the contact portions 7 of the contacts 5.

The IC card 4 is connected to a data processing circuit in a given electronic device such as a telephone set or the like through the card connector, so that data stored in the IC card 4 are given to the electronic device or data stored in the electronic device are taken into the IC card 4.

The IC card 4 is inserted into the cover 2. The cover 2 has a card receiving space 9 disposed along an inner surface (under surface) of a top plate 2a. The card receiving space 9 is open at a free end of the cover 2. The free end of the cover 2 is located on the side of the cover 2 opposite the basal end where the cover 2 is supported through the pin 3. The opening of the card receiving space 9, which is open at the free end of the cover 2, is defined as a card receiving port 10. The IC card 4 is inserted into and withdrawn from the card receiving space 9 through the card receiving port 10.

One pair of left and right guide rails 2b, 2b extend from the basal end of the cover 2 to a free end thereof along opposite left and right sides of the top plate 2a of the cover 2. The one pair of left and right guie rails 2b, 2b are integral with the top plate 2a of the cover 2. The card receiving space 9 is defined by the left and right guide rails 2b, 2b and the top plate 2a. The card receiving space 9 is open at a free end of the top plate 2a and at free ends of the left and right guide rails 2b, 2b, thereby forming the card receiving port 10.

Left and right side walls 2c, 2c are formed on left and right sides of the top plate 2a in such a manner as to be integral with the top plate 2a. Left and right bottom walls 2d, 2d extend inwardly from the left and right side walls 2c, 2c. The one pair of left and right guide rails 2b, 2b having one pair of left and right guide grooves 2e, 2e are defined by the left and right bottom walls 2d, 2d, the left and right side walls 2c, 2c and the top plate 2a.

The left and right side walls 2c, 2c form a side scale for restricting left and right side surfaces of the IC card 4, the left and right bottom wall 2d, 2d form a bottom scale for restricting under surface at the left and right side edge portions of the IC card 4, and an inner surface (bottom surface) of the left and right side edge portions of the top plate 2a form a top scale for restricting upper surfaces of the left and right side edge portions of the IC card 4.

The left and right side walls 2c, 2c and the one pair of left and right bottom walls 2d, 2d extend from the basal end of the top plate 2a to the free end along the left and right side edges of the top plate 2a, thereby forming the left and right guide rails 2b, 2b.

The cover 2 is rotated about the pin 3 so as to be closed with respect to the base 1, so that each external terminal 8 of the IC card 4 is pushed against the contact portion 7 of the corresponding contact 5. When the external terminal 8 is pushed against the contact portion of the contact 5, the resilient contact piece 6 of the contact 5 is displaced against resiliency thereof, and the contact portion 7 is brought into contact, under pressure, with the external terminal 8 by reaction thereof.

The cover 2, which is formed of an electrically conductive metal plate, covers the IC card 4. The electrically conductive cover 2, when closed with respect to the base 1, is connected to a ground line of a circuit board 12 through a shielding contact element provided on the base 1, thus enabling formation of a shield structure on a local portion of the cover 2.

Between the base 1 and the cover 2, there is a provision of a lock mechanism for holding a closed position of the cover 2 with respect to the base 1. A pressure contacted relation between the contact 5 of the card connector and the external terminal 8 of the IC card 4 is maintained by holding the closed position of the cover 2 with respect to the base 1 by the lock mechanism. When the lock mechanism is unlocked to cancel the locked state of the cover 2 with respect to the base 1, the IC card 4 can be inserted into and withdrawn from the cover 2.

A lock bar 13 extending in parallel to the card receiving port 10 is supported by pin holes 14' through pins 14 on the other end portion of the base 1 such that the lock bar 13 can be rotated in a locking direction and in an unlocking direction and then resiliently held in the locking direction by a spring 15.

The spring 15 for resiliently holding the lock bar 13 is formed of an elongate plate spring. A basal end of this plate spring 15 is fixed to one end portion of the base 1 by insert molding or the like and allowed to project downwardly of the lock bar 13 from the end edge of the base 1. A free end of the spring 15 resiliently contacts a bottom surface of the lock bar 13, thereby normally resiliently holding the lock bar 13 in the locking direction.

One pair of lock portions 16 are provided on longitudinally opposite ends (left and right ends) of the lock bar 13. On the other hand, the guide rails 2b, 2b are provided on free ends thereof with one pair of opponent portions (lock engaging portions) 17.

The free end of each guide rail 2b is allowed to project in its extending direction, and the opponent portion 17 is formed on a projecting portion of the guide rail 2b. An upper surface of the opponent portion 17 has a stepped area 18 such that the stepped area 18 of the upper surface of the opponent portion 17 is lower than the upper surface of the top plate 2a. The lock portion 16 of the lock bar 13 is hooked on the stepped area of the opponent portion 17, thereby retaining the closed position of the cover 2 with respect to the cover 2.

The lock bar 13, when the cover 2 is closed with respect to the base 1, extends forwardly of the card receiving port 10 in such a manner as to face the card receiving port 10, to thereby form a window 19 between the free end edges of the lock bar 13 and the cover top plate 2a so that an end portion of the card 4, which is received in the card receiving space 9, is exposed therethrough.

The lock portion 16 of the lock bar 13 is provided with a first guide surface 20. This first guide surface 20, when the cover 2 is closed with respect to the base 1, is pushed by the opponent portion 17 of the cover 2 to rotate the lock bar 13 slightly in the unlocking direction against the resiliency.

Further, the lock bar 13 is formed on an inner surface thereof with a second guide surface 21. This second guide surface 21 is slanted to guide the end edge of the IC card in accordance with the rotation of the lock bar 13.

The lock portion 16 is provided on a free end portion of the lock bar 13 and has a hook-like configuration in section. A slanted surface comprised of a curved or straight surface facing the card receiving port 10 is formed in such a manner as to be continuous with a top surface of the hook portion. This slanted surface serves as the first guide surface 20. With abutment of a lower edge of the opponent portion 17 on the cover 2 side with respect to this first guide surface 20, the lock bar 13 is rotated slightly outwardly (unlocking direction) against the effect of the spring 15, such that the closing action of the cover is guided.

On the other hand, the lock bar 13 has an inner surface continuous with a top surface thereof or a top surface of that portion of the lock bar 13 which extends between the one pair of lock portions 16 and facing the card receiving port 10. This inner surface is slanted as the lock bar 13 is rotated slightly in the unlocking direction through coaction between the opponent portion 17 and the first guide surface 20. This slanted inner surface serves as the second guide surface 21.

The contacts on one row each have a surface mount terminal 11 projecting downwardly of the lock bar 13. The lock bar 13 is provided with an opening portion 22 through which the surface mount terminal 11 can be visually vertically recognized. For example, as illustrated, cutout portions corresponding the the surface mount terminals 11 are formed along the end edge of the lock bar 13. Those cutout portions serve as the opening portions 22.

The surface mount terminals 11 of the contacts 5 arranged on the other row are located on the side where the cover 2 is supported on the base 1 through the pin, so that the surface mount terminals 11 can be visually vertically recognized through a window 23 formed in the top plate 2a of the cover 2.

When the hooking state of the lock bar 13 with respect to the cover 2 is canceled, the cover 2 is pushed up by restoring force of the contact portions 7. In order to obtain a sufficiently large push-up force, a return spring formed of, for example, an elongate plate spring 24 is provided. One end of the plate spring 24 is insert-molded in the vicinity of the area where the cover 2 is supported on the base 1 through the pin and the other end is allowed to extend towards the free end side of the cover 2 so as to be resiliently contacted with the bottom surface of the guide rail 2b, i.e., the bottom surface of the bottom wall 2d forming the guide rail 2b, thereby pushing up the overall cover 2.

Preferably, right and left springs 24 are arranged in such a manner as to push up the guide rails 2b.

The cover 2 is closed against the effects of both the spring 24 and the contacts 5 and opened by the restoring forces thereof.

The present invention relates to a card connector, in which an IC card is retained by the cover and the cover with the IC card therein is closed with respect to the base so that the external terminals of the IC card are brought into contact, under pressure, with the contacts arranged on the base. In this card connector, it is indispensable to provide a lock mechanism for maintaining the pressure contact state between the card and the contacts by maintaining the closed position of the cover with respect to the base. In this invention, the lock bar, which is rotatably supported, through a pin, on an end portion of the base in its lateral posture and resiliently held in the locking direction, is detachably attached to a free end of the cover. Owing to this arrangement, the cover can be opened and closed easily and reliably. Thus, there can effectively be solved such problems, which are inherent in the conventional devices having a lock mechanism for snap fitting a side plate of the cover to a side surface of the base, that the unlocking operation is difficult and the lock pawl tends to be cut off, thus resulting in insufficient engagement.

Also, according to the present invention, the connector can be made small in size and thin in design.

Moreover, when a locked state is realized by the lock bar engaged with the free end of the cover, the IC card inserted into the cover can easily be visually recognized through the window formed between the free end edges of the lock bar and the top plate of the cover. This enhances a smooth insertion and withdrawal of the IC card with ease.

In addition, owing to a provision of the first and second guide surfaces, the cover retaining the IC card can easily be brought into a closed position and the IC card can efficiently be guided to the position where the IC card is brought into electrical connection with the contacts.

Although this invention has been described in its preferred form with a certain degree of particularity, it is understood that the present disclosure of the preferred form has been made only by way of example and that numerous changes in the details of construction and arrangement of parts may be resorted to without departing from the spirit and the scope of the invention as hereinafter claimed.

What is claimed is:

1. A card connector comprising:

a base having a basal end and a second end;

a cover pivotally supported on said basal end of said base by a pivot pin such that said cover can pivot between open and closed positions relative to said base;

said cover including a top plate, and first and second guide rails extending from a basal end of said cover to a free end thereof along first and second sides of said top plate, a card receiving space being defined in said cover by said top plate and said first and second guide rails, said card receiving space opening at said free end of said cover to define a card receiving port;

a plurality of contacts arranged on said base for contact under pressure with external terminals of an IC card when the IC card is inserted into said card receiving space and said cover is in said closed position;

an elongated lock bar extending in parallel to said card receiving port;

wherein said first and second guide rails have lock engaging portions thereon, respectively, at said free end of said cover;

wherein said elongated lock bar has lock portions at opposite ends thereof engageable with said lock engaging portions of said first and second guide rails, respectively;

wherein said elongated lock bar is rotatably mounted at said second end of said base for rotation in a locking direction toward engagement of said lock portions of said lock bar with said lock engaging portions of said first and second guide rails, and an unlocking direction opposite said locking direction;

wherein said elongated lock bar is resiliently biased to rotate in said locking direction; and wherein each of said lock portions of said elongated lock bar is provided with a first guide surface arranged such that, upon pivoting of said cover toward said closed position, said first guide surfaces are pushed by said lock engaging portions, respectively, to rotate said lock bar in said unlocking direction.

2. A card connector according to claim 1, wherein said elongated lock bar is provided, inwardly of said lock portions, with a second guide surface for guiding an end edge of the IC card when the IC card is received in said card receiving space and upon pivoting of said cover to said closed position.

3. A card connector according to claim 1, wherein each of said contacts includes a surface mount terminal projecting below said elongated lock bar; and said elongated lock bar has an opening through which said surface mount terminals of said contacts can be viewed from above.

4. A card connector according to claim 1, wherein said first and second guide rails include forwardly projecting portions which extend beyond said top plate in a direction from said basal end of said cover to said free end thereof; and said forwardly projecting portions comprise said lock engaging portions of said first and second guide rails, respectively.

5. A card connector according to claim 4, wherein said lock engaging portions of said first and second guide rails comprise downwardly stepped areas of upper surfaces of said forwardly projecting portions of said first and second guide rails, respectively, and said stepped areas are engageable by said lock portions of said elongated lock bar, respectively.

6. A card connector according to claim 5, wherein said elongated lock bar is provided, inwardly of said lock portions, with a second guide surface for guiding an end edge of the IC card when the IC card is received in said card receiving space and upon pivoting of said cover to said closed position.

7. A card connector according to claim 5, wherein each of said contacts includes a surface mount terminal projecting below said elongated lock bar; and said elongated lock bar has an opening through which said surface mount terminals of said contacts can be viewed from above.

8. A card connector according to claim 1, wherein said first and second guide rails have first and second bottom walls provided thereon and extending thereover for supporting the IC card.

* * * * *